United States Patent [19]

Shellhause

[11] 3,727,987

[45] Apr. 17, 1973

[54] DECELERATION ENERGIZED LOAD CONTROLLED BRAKE VALVE

[75] Inventor: Ronald L. Shellhause, Vandalia, Ohio

[73] Assignee: General Motors Corporation, Detroit, Mich.

[22] Filed: Jan. 13, 1972

[21] Appl. No.: 217,542

[52] U.S. Cl.................................303/6 C, 303/24 F
[51] Int. Cl..............................................B60t 13/00
[58] Field of Search..............................303/6 C, 24 F

[56] References Cited

UNITED STATES PATENTS

| | | | |
|---|---|---|---|
| 3,489,465 | 1/1970 | Bueler | 303/6 C X |
| 3,669,507 | 6/1972 | Stokes | 303/6 C |
| 3,672,728 | 6/1972 | Keady et al. | 303/6 C |

Primary Examiner—M. Henson Wood, Jr.
Assistant Examiner—John J. Love
Attorney—W. E. Finken et al.

[57] ABSTRACT

A combination valve assembly for a dual circuit brake system in which a metering valve is in one circuit, a proportioner is in the other circuit, and a hydraulically reset pressure loss warning indicator unit is sensitive to both circuits. The proportioning action rates change to match vehicle loading, to accommodate uphill and downhill grades, and to accommodate any brake fade. This is accomplished providing a deceleration sensing mechanism which locates the proportioner piston to determine the amount of proportioning required based on the pressure at which deceleration triggers an inertia valve in the proportioner. Actuation of the warning unit because of pressure loss in the metering valve circuit causes the proportioner to be overridden by removing a valve element from a closed position to permit direct flow so that pressure through the proportioner is not proportioned.

4 Claims, 1 Drawing Figure

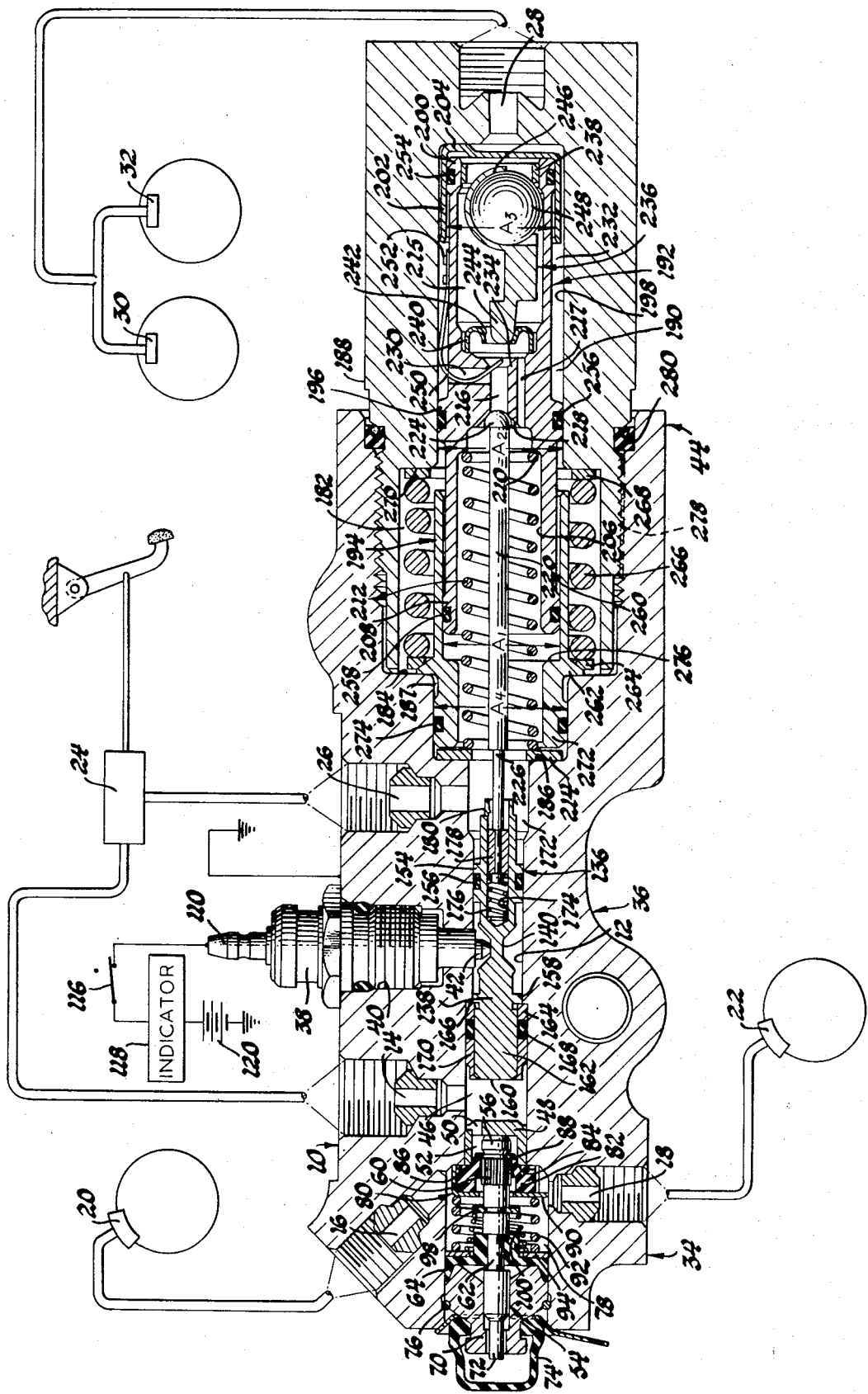

3,727,987

DECELERATION ENERGIZED LOAD CONTROLLED BRAKE VALVE

SUMMARY OF THE INVENTION

The invention relates to a vehicle dual circuit combination valve assembly, and more particularly to one having a pressure loss warning unit and a proportioner unit with proportioner override, the proportioning action being modified by deceleration sensing. The override action occurs when pressure loss occurs in the brake circuit not containing the proportioner, and in an uncorking type of action in which a normally closed valve element is moved away and out of engagement with the movable proportioner element to permit direct and unproportioned delivery of brake pressure through the proportioner. By use of the deceleration sensing mechanism, the proportioning rates change to accommodate variations in vehicle loading without requiring physical attachment to the vehicle suspension system, thereby effectively simulating load sensing. Brake fluid is permitted to pass uninhibited to the rear brakes during brake apply until sufficient deceleration is obtained to energize the inertia valve within the proportioner piston. During the initial pressure build-up, prior to deceleration energization, the proportioner piston moves toward the front of the assembly due to differential areas exposed to the brake supply pressure. The amount of piston movement having taken place when deceleration energization occurs sets the amount of displacement that the proportioner is capable of producing. When deceleration energization occurs, the inertia valve closes, the proportioner piston direction of movement is reversed, and displacement proportioning action begins. When the vehicle is lightly loaded deceleration energization occurs more quickly since the same brake pressure will establish a higher deceleration rate under that condition than it will for a heavily loaded vehicle. Therefore, the initial forward travel of the proportioner piston is small and proportioning takes place at a lower pressure gradient. For heavy vehicle loads the proportioner piston will initially move further forward and a multiplier piston comes into play upon deceleration energization to provide increased rearwardly acting thrust and increase the pressure gradient at which proportioning takes place.

IN THE DRAWING

The single FIGURE illustrates mechanism embodying the invention, with parts in section, and with a schematic showing of the brake system and warning circuits.

DESCRIPTION OF THE PREFERRED EMBODIMENT

The housing 10 is provided with a through bore 12 having several shoulders thereon and divided into several chambers as will be described. The front brake pressure inlet 14 connects with a left center portion of the bore 12, and outlets 16 and 18 connect with the left end portion of the bore 12. These outlets are connected to the two front disc brakes 20 and 22 of the vehicle. The rear brake pressure from the master cylinder 24 passes through inlet 26, connected to the right center portion of the bore 12, and the outlet 28 at the right end of the bore 12 is connected to the rear brakes 30 and 32.

The left portion 34 of the assembly comprises the metering section, which prevents initial front disc brake pressure buildup until the rear brake shoes contact the drums. The pressure thus held off is then admitted to the front brakes at higher input pressures.

The center portion 36 of the assembly comprises a warning section including a latch-type hydraulic reset warning switch assembly and actuator. The switch assembly 38 is threaded into a housing opening 40 so that the switch plunger 42 extends into the center portion of the housing bore 12.

The right portion 44 of the assembly includes a proportioner section comprising a rear brake pressure proportioner, a proportioner override arrangement, and deceleration sensing and control mechanism.

METERING SECTION

Front brake pressure enters inlet 14 and chamber 46, provided in a part of bore 12. The left side of chamber 46 is defined by the valve pin stop 48. This stop is cup shaped, and is provided with one or more openings 50 through which chamber 46 is connected to the chamber 52 inside the cup. The metering valve pin 54 has a smooth head 56 positioned in chamber 52 and separated by a groove from a knurled pin section 60. The pin extends leftwardly to a reduced pin section 62 about which diaphragm seal 64 is mounted. The pin 54 is slidably mounted in a bore formed through the valve plug 70. The pin reduced end 72 extends outwardly through the valve plug and is covered by the metering valve boot 74. The valve plug 70 is held in the left end of the housing bore by retainer ring 76.

The chamber 78 between diaphragm seal 64 and the valve pin stop 48 contains the metering valve 80. The outer portion 82 of valve 80 acts as a valve which sealingly engages a valve seat 84 formed by the valve pin stop 48 and a shoulder 86 of bore 12. The annular portion of metering valve 80 has an axially extending annular section or lip 88 which (in the position shown) receives and engages the outer periphery of the pin knurled land 60. A valve retainer and spring seal 90 presses against the other side of metering valve 80 relative to valve pin stop 48 and is engaged by compression spring 92, which also acts against spring seat 94 and the outer periphery of diaphragm seal 64. The portion of pin 54 intermediate land 60 and section 62 has a groove receiving a spring seat 98. Spring 100 seats against spring seats 94 and 98 and urges pin 54 rightwardly toward engagement by the end of head 56 with pin stop 48. The front brake pressure outlets 16 and 18 connect with chamber 78.

When brake pressure is initially applied, fluid passes through inlet 14, chamber 46, passages 50, chamber 52, and the axially grooved openings formed by the knurled land 60, to chamber 78. This initial pressure may be between 0 and 30 psi, for example. This light initial pressure in chamber 78 is transmitted to the front brakes 20 and 22 and also acts on diaphragm seal 64 to move metering valve pin 54 to the left against spring 100 until the shoulder of the knurled land 60 engages the inner annulus of spring retainer 90. This provides a first stop for the pin 54, at which time the smooth outer periphery of pin head 56 has moved to engage the lip 88 of the metering valve 80, blocking off further flow of fluid from chamber 52 to chamber 78.

Additional inlet pressure must now be built up before additional pressure can be supplied through the valve assembly to the front brakes. This pressure is called the "hold-off" pressure and is controlled by the effective area of the metering valve 80 and the load of spring 92. The "hold-off" pressure may be varied from about 60 to 200 psi as required for a particular vehicle.

Continued increase in inlet pressure in chambers 46 and 52 acts on the effective area of the metering valve 80 and the head 56 of the metering valve pin 54 and eventually causes the pin 54, the valve 80, and the spring retainer 90 to move leftwardly against the forces of springs 92 and 100 to open the valve 82 relative to its seat 84. Inlet pressure is then admitted to chamber 78 past the outer periphery of valve seal 80 and acts on diaphragm seal 64 to move pin 54, with retainer 90 and valve 80, further to the left until a pin land in plug 70 engages the shoulder at the left end of the bore of plug 70. A transition between the inlet pressure and the pressure to the front brakes takes place as this occurs and this transition is completed at a pressure point called the "blend" pressure. The inlet pressure is thereafter the same as the pressure passing through outlets 16 and 18 to the front brakes. The blend pressure is controlled by the relationship of the effective area of diaphragm seal 64 and the spring load of springs 92 and 100.

Upon release of inlet pressure, pin 54 gradually moves rightwardly as do valve spring retainer 90 and valve 80, until the metering valve 80 again has its periphery 82 seating against the valve seat 84. As further release of inlet pressure occurs, the lip 88 of the metering valve lifts to allow pressure to flow from chamber 78 to chamber 52. This allows release of pressure to the front brakes 20 and 22 at a very small pressure differential. Upon complete release, pin 54 assumes the position shown so that chamber 78 is again connected to chamber 52 through the grooves formed by the knurls of pin land 60. These knurls and grooves provide free flow of brake fluid for compensation of change in volume of the hydraulic circuit due to thermal changes.

WARNING SECTION

The switch assembly 38 is threaded into an appropriate opening 40 in housing 10. A terminal 110 extends outwardly and is electrically connected through a suitable switch 116 to an indicator 118 and a source of electrical energy schematically illustrated as battery 120. Indicator 118 may be a light, bell, or horn, by way of example. Plunger 42 closes a switch in assembly 38 when moved upwardly to complete an electrical connection between the grounded housing 10 and terminal 110, and opens the switch when it moves downwardly.

The switch piston assembly 136, including piston 138, is positioned in the center portion of the bore 12 of housing 10 so that the piston grooved center section 140 is normally aligned with plunger 42, the plunger end being held in groove 140 by the force of a spring in the switch assembly 38. The groove has beveled sides leading to the shoulders and so positioned that movement of piston assembly 136 to either a leftwardly or rightwardly direction causes plunger 42 to be cammed upwardly to close the switch in assembly 38. The switch is held in the closed position by engagement of the lower end of plunger 42 on one of the shoulders. The slightly larger lands of the shoulders aid in holding plunger 42 on a shoulder once it has been positioned there.

The right end of piston 138 is formed as an enlarged land 154 provided with a seal 156. Land 154 and seal 156 guide and seal piston 138 in the right center position of bore 12. The left end of piston 138 has a land 158 of the same diameter as land 154 and guides piston 138 in the left center portion of bore 12. The left outer end 160 of the piston assembly is formed as a land 162 of smaller diameter than lands 154 and 158. A seal retainer 164 slidably fits over land 162 and has a smaller inner diameter than the diameter of lands 154 and 158, but a larger outer diameter than the diameter of those lands. For this purpose, the housing bore 12 is provided with a shoulder 166 against which retainer 164 normally is abutted. An O-ring seal 168 is received about the land 158 intermediate the retainer 164 and another sleeve-like retainer 170. Retainer 170 has the same inner and outer diameters as retainer 164. Retainers 164 and 170 and the seal 168 may move relative to piston 138 under certain conditions.

The left end 160 of piston 138 and one side of retainer 170 are exposed to master cylinder front brake pressure in chamber 46. The right end 154 of piston 138 is exposed to master cylinder rear brake pressure in chamber 172. Rear brake pressure inlet 26 is connected to the master cylinder 24 and to chamber 172.

The piston assembly 136 also has a recess or bore 174 formed in the right end of piston 138 and opening into chamber 172. Spring 176 fits in the inner end of bore 174 and seats on a guide 178 which is slidably received in bore 174. Guide 178 may be in the form of a grooved land, or may be a fluted member. In either case, it is secured to or formed as a part of a valve element of the proportioner section 44 described below in detail. An inwardly lanced tab 180 adjacent the open end of bore 174 provides a stop for guide 178 such that sufficient leftward movement of piston 138 will cause tab 180 to engage guide 178 and thereafter move the guide leftwardly with further leftward movement of piston 138. This provides a lost-motion connection discussed below.

So long as substantially normal front and rear brake pressures exist in chambers 46 and 172, the switch piston assembly 136 will be in the position shown. Should front brake pressure loss occur while rear brake pressure remains, the higher pressure in chamber 172 acting on the right end of piston 138 will move the piston assembly 136 leftwardly. Land 158 will cause seal retainers 164 and 170, as well as seal 168, to also move leftwardly with piston 138. This movement will move plunger 42 upwardly and over one of the adjacent lands until it rests on one of the adjacent shoulders. This will hold switch of assembly 38 closed, holding the warning circuit in the energized condition. When, for example, switch 116 is the vehicle ignition switch, indicator 118 will be energized so long as the ignition switch is closed and piston 138 remains in the actuated condition.

The warning section is hydraulically reset when the front brake system is repaired and front brake pressure is again applied in chamber 46. This pressure will act against the larger combined effective areas of seal retainer 170 and the left end 160 of piston 138 (as compared to the effective area of the right land of piston 138) to move piston assembly 136 rightwardly until the seal retainer 164 again engages the shoulder 166. This recenters the piston assembly and opens the warning switch of assembly 38.

Should rear brake pressure fall substantially below front brake pressure, the piston 138 moves rightwardly, with plunger 42 moving upwardly over the other adjacent land and resting the other adjacent shoulder. When the rear brake pressure is again available in chamber 172, the larger effective area of the right end of piston 138 relative to the effective area of the piston left end 160 permits rear brake pressure to move the piston 133 to the left until its land 158 engages retainer 164. Thus, the position shown is again assumed.

PROPORTIONER SECTION

The right end of the bore 12 through housing 10 is formed to provide chamber 172 and a larger chamber 182. The shoulders 184 and 186 separating the two chambers define with bore 12 an intermediate chamber 187. The proportioning valve cap member and housing section 188 is threaded into chamber 182 and abuts against shoulder 184. Valve cap and housing section 188 has outlet 28 formed axially therein and has a chamber 190 in its inner end to which the outlet 28 is connected. The proportioning piston 192 is reciprocably received in chamber 190 and extends into chamber 182. Annular multiplier piston 194 is reciprocably received in chambers 182 and 187, and receives one end of proportioning piston 192 therein.

The center flange 196 of piston 192 is piloted on the chamber wall 198 of chamber 190. Thus, chamber wall 198 is a bore and piloting surface. The reduced diameter outer end 200 of piston 192 provides a mounting for cap 202, which is in the end of chamber 190 adjacent outlet 28. The end of cap 202 provides a stop for piston outer end 200, and is dimpled to form stops 204 which engage the end of chamber 190 adjacent outlet 28. Cap 202 is sufficiently smaller in diameter than chamber 190, and also is located away from the chamber end due to the formation of stops 204, so as to provide for fluid connection between chamber 190 and outlet 28. Recess 206 formed in the inner end 208 of piston 192 has a recessed shoulder 210 to provide a seat for compression spring 212. The other end of spring 212 engages spring seat 214, which abuts shoulder 186. Thus, in the assembled position, spring 212 urges piston 192 to the right so that it abuts cap 202 and is limited in its axially rightward movement by piston stop 204.

Piston 192 has another recess or chamber 215 formed in its outer end 20 in which the inertia mechanism is located. Chamber 215 is connected with recess 206 by means of axial passage 216 and one or more offset passages 217 which are parallel to passage 216. The end of passage 216 opening into recess 206 is formed to provide a valve seat 218. Valve seat 218 is one valve element of the proportioner override valve. The valve stem 220 extends through recess 206 of piston 192 and its outer end is provided with a valve element 224 which mates with valve seat 218. The inner end 226 of valve stem 220 extends into piston bore 174 and has guide 178 formed thereon or secured thereto by suitable means. Thus, a lost motion connection is provided between valve stem 220 and the switch piston 138.

A cross passage 230 in piston 192 intermediate recesses 206 and 215 connects passage 216 with annular chamber 232, defined by wall 198 and the outer surface of piston outer end 200 and being a part of chamber 190. The end of passage 216 opening into recess 215 is formed to provide inertia valve seat 234. The inertia valve 236 is loosely positioned in recess 215 for axial and transverse movement, with retainer 238 at the outer end of the recess 215 limiting its rearward movement and venturi baffle 240 at the inner end of the recess guiding and limiting its forward movement. Baffle 240 has a generally semi-torus configuration with the concave portion facing the ends of passages 217, and the inner periphery 242 guiding and engaging the tapered valve element 244 formed as the forwardly extending part of inertia valve 236. The rearwardly extending portion 246 of valve 236 is cup-shaped to receive inertia ball 248. A finger-like valve release spring 250 is secured to the outer surface of piston end 200 by clip 252, the spring extending forwardly in chamber 232, through passage 230, and projecting into the portion of passage 216 forming seat 234 so that it is yieldingly engageable with valve element 244 when that element seats on seat 234. Seals 254, 256 and 258 are respectively provided on proportioner piston end 200, center flange 196, and proportioner piston end 208.

Multiplier piston 194 has a through-bore 260 with the inner end 208 of piston 192 reciprocably received therein and sealed by seal 258. Flange 262 on piston 194 receives spring seat 264 on one side thereof and may abut shoulder 184 on its other side. A compression spring 266 has one end engaging seat 264 and the other end engaging a seat 268, which is positioned against a shoulder 270 formed on housing section 188 at the rear end of chamber 182. The portion 272 of piston 194 forward of flange 262 extends into chamber 187 and has seal 274 thereon sealingly engaging the wall of chamber 187. An inner shoulder 276 in through-bore 260 is axially aligned with the proportioning piston end 208.

The mechanism is in the position illustrated before brake pressure is applied. Upon application of master cylinder rear brake pressure through inlet 26 and into chamber 172, pressurized fluid passes through passages 217 and 230 and chamber 190, past cup 202, and into outlet 28. As the pressure builds up, it acts on the annular piston area $A_2-A_1$, defined by the area $A_2$ of piston 192 exposed to chamber 190 less the piston Area $A_1$ exposed to bore 260, so as to move piston 192 to the left against the force of spring 212. The spring rate of spring 212 is set to allow sufficient travel of piston 192 to the left to provide adequate displacement during the proportioning cycle. Since pressure is being built up substantially equally and normally in the front and rear brake supply lines, the hydraulic forces do not move the switch piston 138.

The proportioning cycle begins when a predetermined deceleration is attained to trigger the inertia valve. This predetermined deceleration is controlled by the angle at which the assembly is mounted. In a lightly loaded vehicle, it will occur well before piston 192 has moved sufficiently leftward to engage shoulder 276 of multiplier piston 194. When it occurs, valve element 244 moves forwardly through baffle inner periphery 242, engages and moves the end of spring 250 forwardly, and seats against seat 234. This interrupts direct flow through the proportioner by way of passages 217 and chamber 215 to passage 230, chamber 232, around cup 202 and through outlet 28. Therefore, the pressure acting on area $A_2-A_1$ tending to move piston 192 leftwardly does not increase further with further increases of pressure in chamber 172. Piston 192 stops its leftward travel and begins its proportioning action by moving toward the right, displacing fluid through outlet 28 in a proportioning ratio which is a function of the spring load of spring 212 and the relationship of area $A_1-A_3$, acted upon by brake supply pressure to area $A_2-A_3$, acted upon by brake apply pressure. When piston 192 engages cup 202, which in turn is seated against the end of chamber 190 adjacent outlet 28, the brake apply pressure out of outlet 28 remains constant with further increases of brake supply pressure in chamber 172.

With a heavily laden vehicle, more brake pressure is required to obtain sufficient deceleration to trigger the inertia valve and piston 192 moves leftwardly until its end 208 engages shoulder 276 of the multiplier piston 194. The contact of piston 192 with piston 194 nominally occurs at the time deceleration produced by the pressure at this point also triggers the inertia valve with the heavily laden vehicle. When the free flow through the valve is stopped by activation of the inertia valve, the force of the multiplier piston 194 is added to that of piston 192 as it moves to the right. This movement is now a function of multiplier piston area $A_4$ and spring 212 as opposed by area $A_2$ and spring 266. The multiplier piston 194 and proportioner piston 192 will move rightwardly as a unit until end 200 of piston 192 bottoms out on cup 202, with stop 204 engaging the end of chamber 190 adjacent outlet 28.

With an intermediately laden vehicle, the piston 192 will initially move leftwardly further than it does for a lightly laden vehicle but not as far as it does for a heavily laden vehicle when deceleration triggers the inertia valve. The piston 192 then moves rightwardly as before, proportioning by displacement at the light load rate but with a higher starting pressure, until the multiplier piston, also moving rightwardly, catches up and makes contact with it. The output is then boosted by the multiplier piston and the ratio of supply pressure to apply pressure becomes the same as in the heavily loaded vehicle condition but begins at a lesser pressure.

Should the front brake pressure fall substantially below the rear brake pressure, additional work must be done by the rear brakes, and this requires additional rear brake pressure. To get the maximum braking effort under this condition and yet keep brake pedal effort as low as possible, the action of the proportioner is overriden and held out of the system. Thus, when switch piston 138 moves leftwardly due to front brake pressure loss, the guide 178 is engaged by the tab 180 of piston 138 and pulls the valve stem 220 leftwardly to open valve element 224 well away from its seat 218. This forcible removal of the valve element 224 from its normally closed position allows full rear brake pressure to pass from chamber 172 through passages 216 and 230, and chamber 190, to outlet 28, bypassing seat 234 and valve 244. The leftward movement of piston 192 is limited by the engagement of the piston end 208 with multiplier piston shoulder 276, and end 272 of piston 194 with seat 264, which abuts housing shoulder 186. Thus, valve seat 218 cannot move leftwardly a sufficient distance to close the direct connection of chamber 172 with passage 216.

A vent groove 278 allows sufficient expansion of chamber 182 past V-block seal 280 for proper proportioner function. Should either seal 256 or 274 leak brake fluid to chamber 182, collection of fluid will take place in groove 278. However, seal 280 will permit the release of excess fluid leakage collection to allow proper proportioner function. The seal 280 can also function as a vacuum bleeding seal, allowing vacuum bleeding of new cars on assembly lines.

It is an important aspect of the invention to provide structure which mitigates the flow sensitivity of the inertia valve element 244 prior to the deceleration triggering action. This is provided by locating passages 217 in such alignment with the torus interior of baffle 240 that fluid flowing through passages 217 is directed through seat 234 without exerting any flow-related effect on valve element 244 so long as it is in the position illustrated. However, when valve element 244 is triggered by deceleration to move through the baffle inner periphery 242 and toward seat 234, flow of fluid aids in quickly seating the valve element. Also, when the apply pressure is released, spring 250 will aid in moving valve 236 rearwardly, as will apply pressure in passage 216, returning the valve to the position shown.

What is claimed is:

1. A displacement type fluid pressure proportioner having an inlet and an outlet and comprising:

a first displacement piston having opposed effective differential areas one of which is subjected to an inlet pressure and the other of which is selectively subjected to the inlet pressure and an outlet pressure, and first resiliently yieldable means urging said piston in an outlet pressure increasing direction, control means having a first control condition subjecting both of said opposed effective differential areas to an increasing inlet pressure whereby said first piston is moved against said first resiliently yieldable means and outlet pressure is the same as inlet pressure, and a second control condition disconnecting the other effective differential area from the inlet and subjecting it to the outlet pressure whereby the first mentioned first piston movement is stopped and further inlet pressure increase moves said first piston in the opposite direction to increase outlet pressure in a predetermined ratio with the increase in inlet pressure by displacement, second resiliently yieldable means and a second piston having an effective area subjected to the inlet pressure urging it to move in the first piston opposite direction against said second resiliently yieldable means and engageable with said first piston at a point which is a function of the increase in inlet pressure and the inlet pressure at which said control means changes from said first control condition to said second control condition, said second piston upon further increase in inlet pressure after engagement with said first piston exerting additional force on said first piston in said first piston opposite direction of movement.

2. The proportioner of claim 1 in which the inlet and outlet are adapted to be connected in a vehicle hydraulic braking circuit to proportion brake apply pressure to a hydraulically actuated brake to decelerate the vehicle, said control means comprising a vehicle deceleration rate sensing valve which moves from the open first control condition to the closed second control condition when a predetermined vehicle deceleration rate is attained, and returns to the first control condition when the vehicle deceleration rate falls below the predetermined vehicle deceleration rate.

3. The proportioner of claim 1 in which the inlet and outlet are adapted to be connected in a first vehicle hydraulic braking circuit providing brake supply pressure to the inlet to proportion brake apply pressure from the outlet to a hydraulically actuated brake to decelerate the vehicle, and means adapted to sense brake supply pressures in the first vehicle hydraulic braking circuit and a second vehicle hydraulic braking circuit and acting upon a predetermined pressure differential therebetween characterized by a relative decrease in the second vehicle hydraulic braking circuit brake supply pressure to fluid connect said inlet to said outlet through said first piston independently of said control means.

4. A brake apply pressure proportioner for a vehicle brake system circuit having a source of vehicle operator-controlled brake supply pressure, said proportioner comprising:

a housing having an axially extending bore therein, a brake supply pressure inlet and a brake apply pressure outlet connected with said bore, said housing being axially oriented generally fore-and-aft of the vehicle when installed therein;

a proportioner piston reciprocably received in one end of said bore adjacent said outlet and having a forwardly opening first recess in the forward end thereof and a rearwardly opening second recess in the rearward end thereof;

first and second passage means connecting said first and second recesses;

first valve means normally closing said first passage means connection to said first recess;

said piston having a flange between said ends of greater diameter than either of said ends and sealingly fitting said bore one end with said piston rearward end forming with said bore one end an annular chamber communicating with said outlet;

means on said piston rearward end closing said second recess;

third passage means operatively fluid connecting said first passage means and said annular chamber;

a multiplier piston reciprocably received in the other end of said bore adjacent said inlet and having a stepped bore therethrough, said proportioner piston forward end being reciprocably and sealingly received in the larger portion of said stepped bore, said inlet being in fluid communication with said other bore end and with said stepped bore to provide brake supply pressure therein and in said proportioner piston first recess;

first spring means yieldably resisting forward movement of said proportioner piston and second spring means yieldably resisting rearward movement of said multiplier piston;

deceleration rate sensing valve means sensitive to a predetermined vehicle deceleration rate to close said first passage means connection to said second recess and thereby fluidly disconnect brake supply pressure and brake apply pressure;

said brake supply pressure acting with said first spring means on said proportioner piston in opposition to brake apply pressure acting thereon to displace said proportioner piston toward said outlet and increase brake apply pressure at a first proportionate rate from the pressure at the time said deceleration rate sensing valve means closed connection to a higher brake apply pressure determined by the amount of displacement of said proportioner piston available as established by the amount of prior forward movement thereof under influence of brake pressure before said deceleration rate sensing valve means closed;

and means actuable under a predetermined vehicle brake system condition to move said first valve means to open the connection of said first passage means to said first recess and establish brake supply pressure communication therethrough to said outlet independently of vehicle deceleration.

* * * * *